(12) United States Patent
Mathieu

(10) Patent No.: US 12,272,840 B2
(45) Date of Patent: Apr. 8, 2025

(54) CONNECTING MEANS BETWEEN TWO PARTS OF A BUS BAR

(71) Applicants: Renault s.a.s., Boulogne-Billancourt (FR); NISSAN MOTOR CO., LTD., Yokohama (JP)

(72) Inventor: Alexandre Mathieu, Rouen (FR)

(73) Assignees: AMPERE S.A.S., Boulogne-Billancourt (FR); NISSAN MOTOR CO., LTD., Yokohama (JP)

( * ) Notice: Subject to any disclaimer, the term of this patent is extended or adjusted under 35 U.S.C. 154(b) by 769 days.

(21) Appl. No.: 17/610,914

(22) PCT Filed: Jun. 11, 2020

(86) PCT No.: PCT/EP2020/066180
§ 371 (c)(1),
(2) Date: Nov. 12, 2021

(87) PCT Pub. No.: WO2020/254178
PCT Pub. Date: Dec. 24, 2020

(65) Prior Publication Data
US 2022/0216573 A1 Jul. 7, 2022

(30) Foreign Application Priority Data
Jun. 20, 2019 (FR) ...................................... 1906668

(51) Int. Cl.
*H01M 50/505* (2021.01)
*H01M 50/204* (2021.01)
*H01M 50/503* (2021.01)

(52) U.S. Cl.
CPC ....... *H01M 50/505* (2021.01); *H01M 50/204* (2021.01); *H01M 50/503* (2021.01); *H01M 2220/20* (2013.01)

(58) Field of Classification Search
CPC ............. H01M 50/505; H01M 50/503; H01M 50/204; H01M 2220/20
See application file for complete search history.

(56) References Cited

U.S. PATENT DOCUMENTS

2020/0020914 A1   1/2020   Fukushima et al.

FOREIGN PATENT DOCUMENTS

| EP | 2 697 846 B1 | 7/2015 |
| JP | 8-83654 A | 3/1996 |
| WO | WO 2018/155249 A1 | 8/2018 |

OTHER PUBLICATIONS

Japanese Office Action issued on Feb. 28, 2023 in Japanese Patent Application No. 2021-574281, 6 pages.
(Continued)

*Primary Examiner* — Jane J Rhee
(74) *Attorney, Agent, or Firm* — Oblon, McClelland, Maier & Neustadt, L.L.P.

(57) ABSTRACT

A connection that provides an electrical junction between a first portion of an electrically conducting bus bar and a second portion of the bus bar includes a male portion to be secured to the first portion of the bus bar and a female portion to be secured to the second portion of the bus bar. The male portion and the female portion are able to fit into one another respectively by following a first translational movement of the female portion relative to the male portion along a first axis, followed by a second rotational movement of the female portion relative to the male portion about a second axis perpendicular to the first axis.

19 Claims, 7 Drawing Sheets

(56) References Cited

OTHER PUBLICATIONS

International Search Report issued on Sep. 14, 2020 in PCT/EP2020/066180 filed on Jun. 11, 2020, 2 pages.

French Preliminary Search Report (with English translation of Categories of Cited Documents) issued on Mar. 6, 2020 in French Application 1906668 filed on Jun. 20, 2019, 3 pages.

CONNECTING MEANS BETWEEN TWO PARTS OF A BUS BAR

The invention relates to a connecting means for providing the junction between a first part of a bus bar and a second part of such a bus bar for electrical conduction between modules of a battery. The invention furthermore relates to a bus bar comprising such a connecting means. The invention furthermore relates to a battery comprising such a bus bar. The invention furthermore relates to an automobile vehicle comprising such a battery and/or such a bus bar. The invention furthermore relates to a method for assembling such a bus bar.

An automobile vehicle, in particular a hybrid or electric vehicle, generally comprises a battery comprising various modules. The volume of each module is generally maximum in view of the space available for accommodating it, generally on the floor, in order to maximize the energy storage capacities of each module. This thus results in a restricted space between the modules. However, two adjacent modules are generally connected together by a bus bar which provides the electrical conduction between these two modules. Thus, the lack of space between two modules renders the installation of the bus bar between them complex.

U.S. Pat. No. 8,802,259 B2 describes a particularly compact battery pack for an electric vehicle. It comprises vertically-stacked modules interconnected by flat bus bars. Each of the bus bars forms a complex structure since it is specially designed with respect to the arrangement of the modules in one area of the pack. Thus, these bus bars cannot be re-used if the arrangement of the modules is changed. In addition, they impose strict assembly constraints, because each bus bar needs to be able to be installed in a single operation, which is difficult in view of the complexity of each bus bar.

The aim of the invention is to provide a connecting means for a bus bar that overcomes the drawbacks hereinabove. In particular, the invention provides a connecting means that is simple, reliable and durable for installing a bus bar within a tight space between modules.

In order to achieve this aim, the invention relates to a connecting means designed to provide the electrical junction between a first part of an electrical conduction bus bar and a second part of said bus bar, the connecting means comprising:
- a male part designed to be rigidly attached to the first part of the bus bar, and
- a female part designed to be rigidly attached to the second part of the bus bar, the male part and the female part being designed to fit into one another respectively following:
- a first translational movement of the female part relative to the male part along a first axis, followed by;
- a second rotational movement of the female part relative to the male part about a second axis perpendicular to the first axis, notably a rotation by a quarter of a turn or substantially by a quarter of a turn.

The male part may comprise a first electrical conduction element, notably in the form of a rectangular or substantially rectangular plate, where the female part may comprise a second electrical conduction element designed to come progressively into contact with the first conduction element throughout the first and second movements, notably a second electrical conduction element in the form of a yoke having two parallel or substantially parallel wings, designed to come progressively into contact with two opposing faces of the plate throughout the first and second movements.

Following the first and second movements, the two opposing faces of the plate may each have a contact area equal to at least four times a right cross-sectional area of a first part or of a second part of such a bus bar, and the two wings of the yoke may each have a contact area in contact with one of the two opposing faces of the plate, where the contact area may be equal to at least four times the right cross-sectional area of a first part or of a second part of such a bus bar.

The male part may comprise a first element for immobilizing the female part, notably a slot, and the female part may comprise a second immobilizing element designed to cooperate with the first immobilizing element, notably a second immobilizing element of the pin type, where the pin can become blocked within the slot following the first and second movements.

The male part may comprise an element for insertion of the second element for immobilizing the female part, notably a notch coming out at the slot.

The male part may comprise a means for end of travel in rotation, notably an end stop, coming into contact with the female part after the first and second movements.

The invention furthermore relates to an electrical conduction bus bar between modules of a battery, notably of a battery of a hybrid or electric automobile vehicle, the bus bar comprising:
- a first part, and
- a second part, and
- a connecting means between the first and the second parts such as previously defined.

The invention furthermore relates to a battery, notably for a hybrid or electric automobile vehicle, the battery comprising at least one bus bar such as previously defined.

The invention furthermore relates to a hybrid or electric automobile vehicle, comprising a battery such as previously defined and/or at least one bus bar such as previously defined.

The invention furthermore relates to a method for assembling a bus bar such as previously defined, notably for electrically connecting two modules of a battery together, the method comprising a step for supplying:
- a first part of a bus bar comprising a male part,
- a second part of a bus bar comprising a female part, followed by a step for engaging the male part in the female part by following a first translational movement of the female part relative to the male part in a main plane containing the main longitudinal axis of the bus bar in the final connected position, followed by a step for blocking the female part with the male part by following a second rotational movement of the female part with respect to the male part about or substantially about a second axis perpendicular to the main plane, notably a rotation of a quarter of a turn or substantially of a quarter of a turn.

The engagement step may comprise an insertion phase during which a second element for immobilizing the female part, notably a pin, is inserted into an insertion element of the male part, notably a notch.

The blocking step may comprise an end of travel in rotation of the female part against an end of travel means arranged on the male part, notably an end stop, such that a second element for immobilizing the female part is pushed back into a first element for immobilizing the male part, notably a slot.

These subjects, features and advantages of the present invention will be presented in detail in the following description of one embodiment of an automobile vehicle, by way of non-limiting example, in relation with the appended figures amongst which:

The direction in which an automobile vehicle is traveling in a straight line is defined as being the longitudinal direction X. By convention, the direction perpendicular to the longitudinal direction, situated in a plane parallel to the ground, is called transverse direction Y. The third direction, perpendicular to the other two, is called vertical direction Z. Thus, a right orthogonal reference frame XYZ is used in which X is the longitudinal direction in the front-rear direction of the vehicle, hence directed toward the rear, Y is the transverse direction directed toward the right and Z is the vertical direction directed upward. The "forward" direction corresponds to the direction in which the automobile vehicle is usually traveling in the longitudinal direction and is opposite to the "back" direction.

Figure 1:
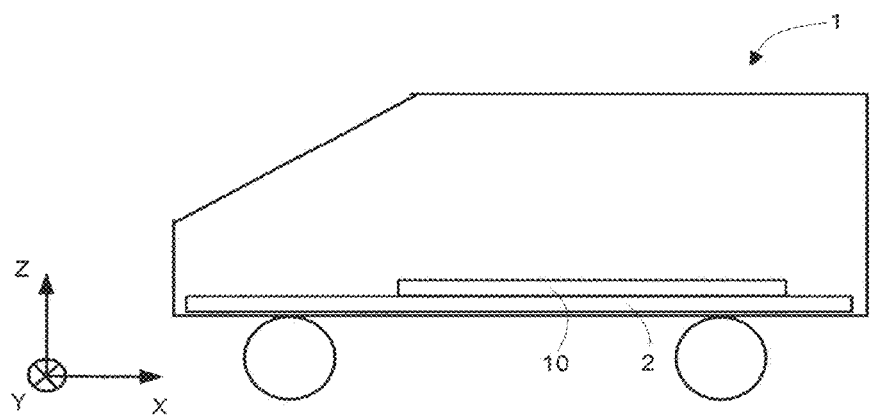
FIG. 1 is a schematic view of an automobile vehicle according to one embodiment of the invention.

One example of an automobile vehicle 1 according to one embodiment of the invention is illustrated schematically in FIG. 1. The automobile vehicle 1 is for example an electric vehicle or a hybrid vehicle, known by the abbreviation HEV for "Hybrid Electric Vehicle", or else a rechargeable plug-in hybrid vehicle known by the abbreviation PHEV for "Plug-in Hybrid Electric Vehicle". The automobile vehicle 1 preferably comprises a body or housing 2. The automobile vehicle 1 comprises a battery 10, for example fixed onto the housing 2. The battery 10 comprises at least two modules.

Figure 2:
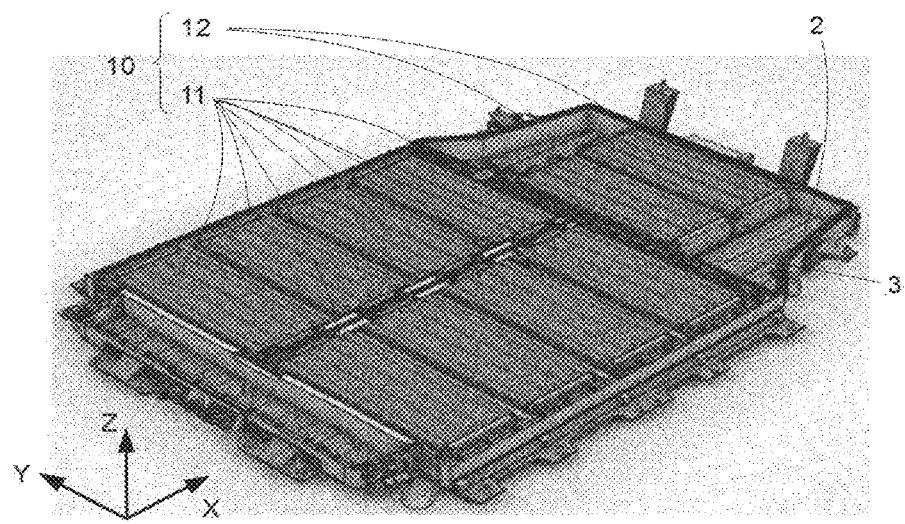
FIG. 2 is a perspective view of a battery of the automobile vehicle according to one embodiment of the invention.

For example, as illustrated in FIG. 2, the battery 10 comprises front modules 11 and rear modules 12. For example, the battery 10 comprises eight front modules and two rear modules 12. For example, the rear modules 12 are separated from the front modules 11 by means of a separation or partition 3.

Figure 3:
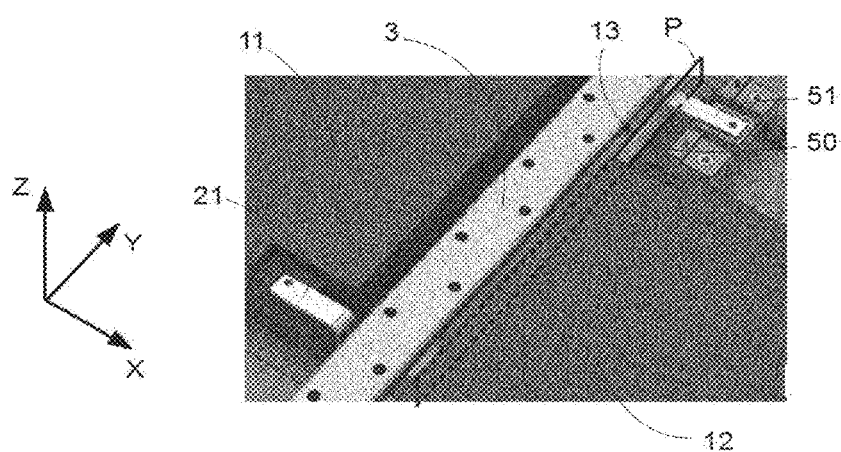
FIG. 3 is a detailed perspective view of the battery according to the embodiment of the invention.

As illustrated in FIG. 3, the battery 10 furthermore comprises a bus bar 13 or current-conducting bar or power bar or distribution bar. Here, this bar 13 is designed to electrically connect a front module 11 and a rear module 12. The electrical conduction bus bar 13 between modules comprises a first part 20 and a second part 50.

Preferably, the first part 20 comprises a part 21 designed for the electrical connection and/or for the fixing of the first part 20 onto the front module 11. Preferably, the second part 50 comprises a part 51 designed for the electrical connection and/or for the fixing of the second part 50 onto the rear module 12.

Figure 4:
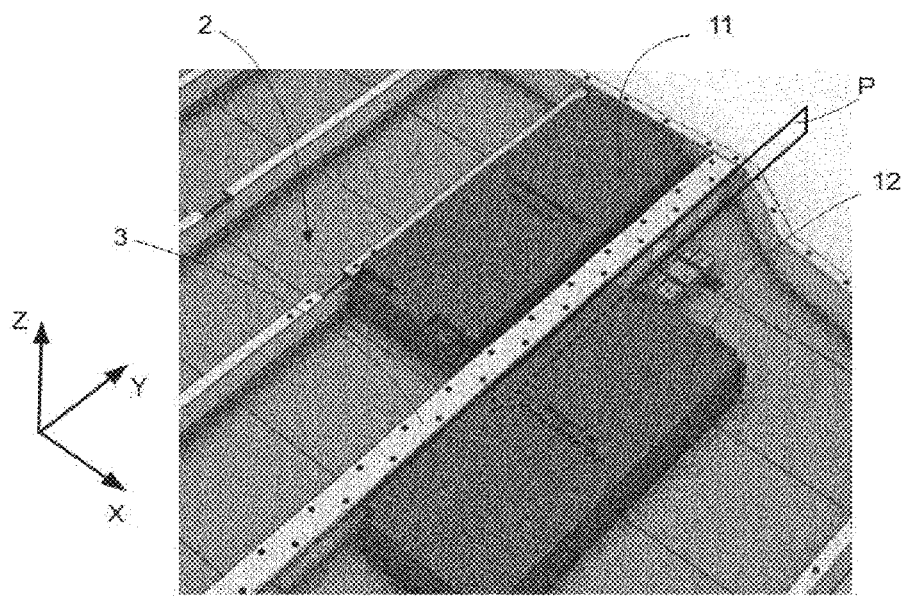
FIG. 4 is a partial perspective view of the battery according to the embodiment of the invention.

Preferably, the second part 50 of the bus bar 13 principally extends in a main plane P, or substantially in a main plane P, notably in the final assembled position of the bar 13. For example, the part 51 extends perpendicularly to the second part 50. For example, the main plane P extends vertically, or substantially vertically, and transversally, or substantially transversally, as illustrated in FIGS. 3 and 4.

The bar 13 furthermore comprises a connecting means 40 or fixing or assembly means allowing the first part 20 to be connected and/or fixed to the second part 50. Furthermore, the connecting means 40 allows the electrical conduction of the first part 20 to the second part 50 and potentially vice versa.

Thus, the connecting means 40 provides the junction between the first part 20 of the bus bar 13 and the second part 50 of the bus bar 13. More precisely, the connecting means 40 comprises a male part 30 rigidly attached to the first part 20 and a female part 60 rigidly attached to the second part 50.

The phrase "rigidly attached" is understood to mean that the male part 30 is fixed to the first part 20, or even, preferably, that the male part 30 extends from the first part 20. Advantageously, the male part 30 and the first part 20 only constitute a single component. Thus, it is understood that the female part 60 is fixed o the second part 50, or even, preferably, that the female part 60 extends from the second part 50. Advantageously, the female part 60 and the second part 50 only constitute a single component.

The male part 30 and the female part 60 cooperate with one another so as to provide both the fixing of the male part with the female part and the electrical conduction between the male part and the female part and vice versa.

Preferably, the first part 20, in particular the male part 30 of the first part 20, also extends in the main plane P, or substantially in the main plane P, notably prior to the insertion of the female part 60 which is explained in the following part.

Figure 8:
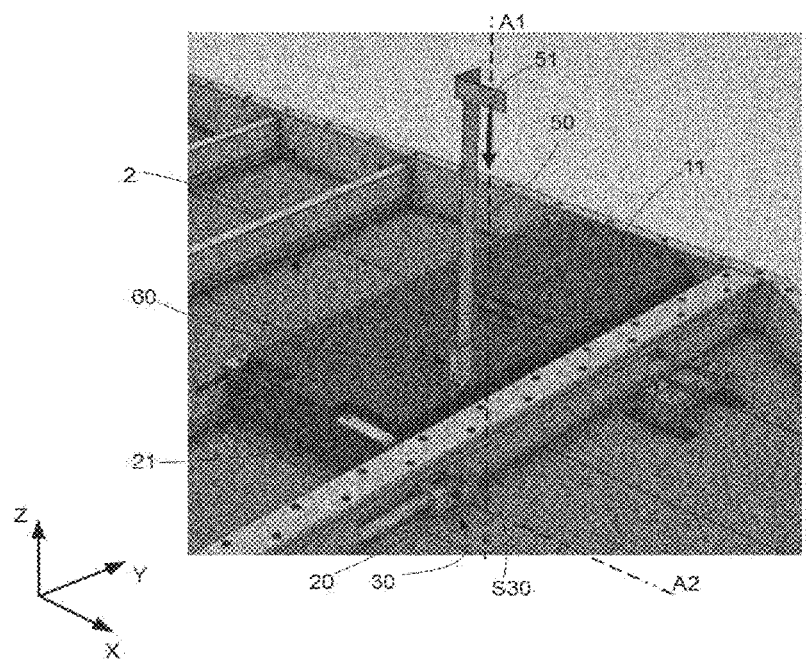
FIG. 8 is another detailed perspective view during the method for assembling the bus bar between two modules of the battery according to the embodiment of the invention.
Figure 9:
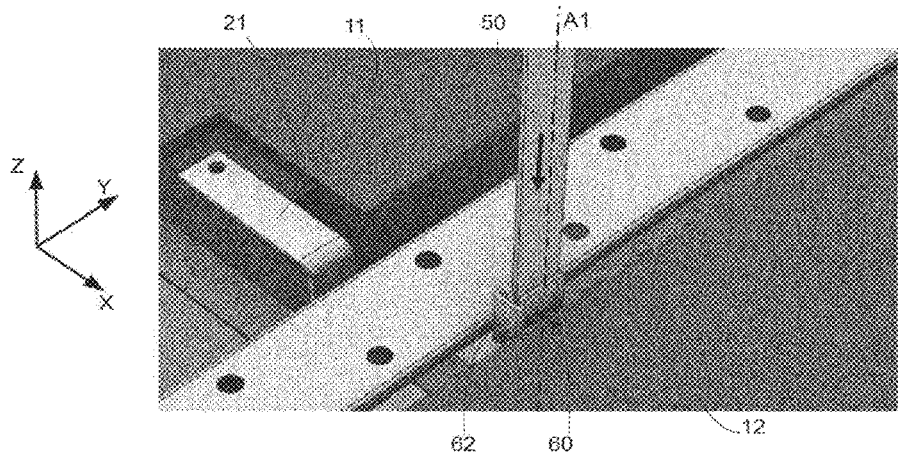
FIG. 9 is another detailed perspective view during the method for assembling the bus bar between two modules of the battery according to the embodiment of the invention.
Figure 10:
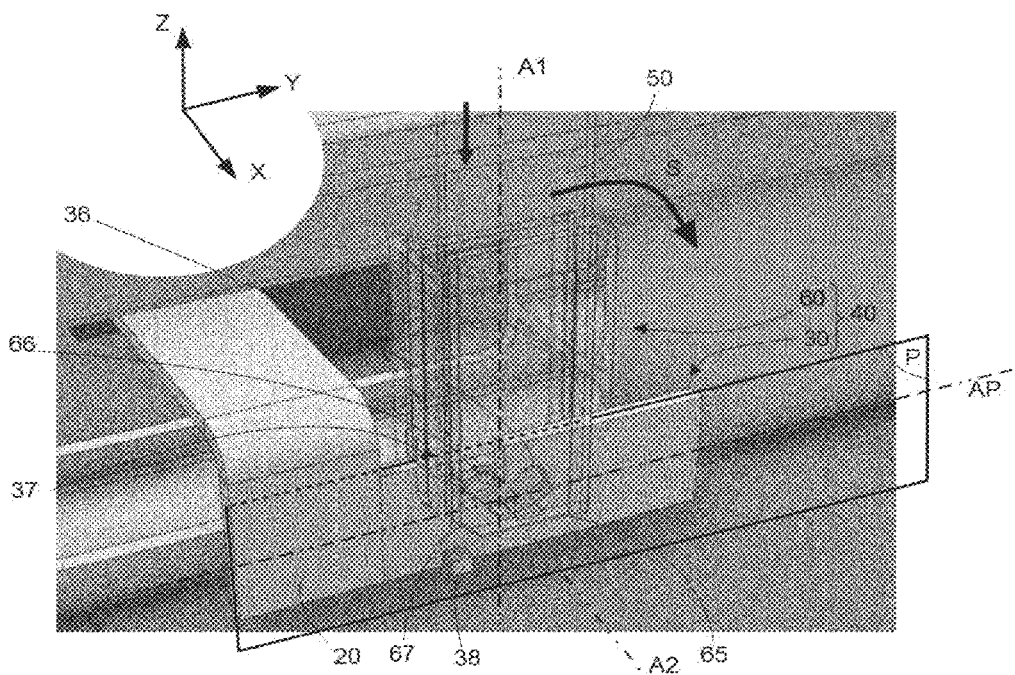
FIG. 10 is another detailed perspective view during the method for assembling the bus bar between two modules of the battery according to the embodiment of the invention, the female part being shown in transparency mode.
Figure 11:
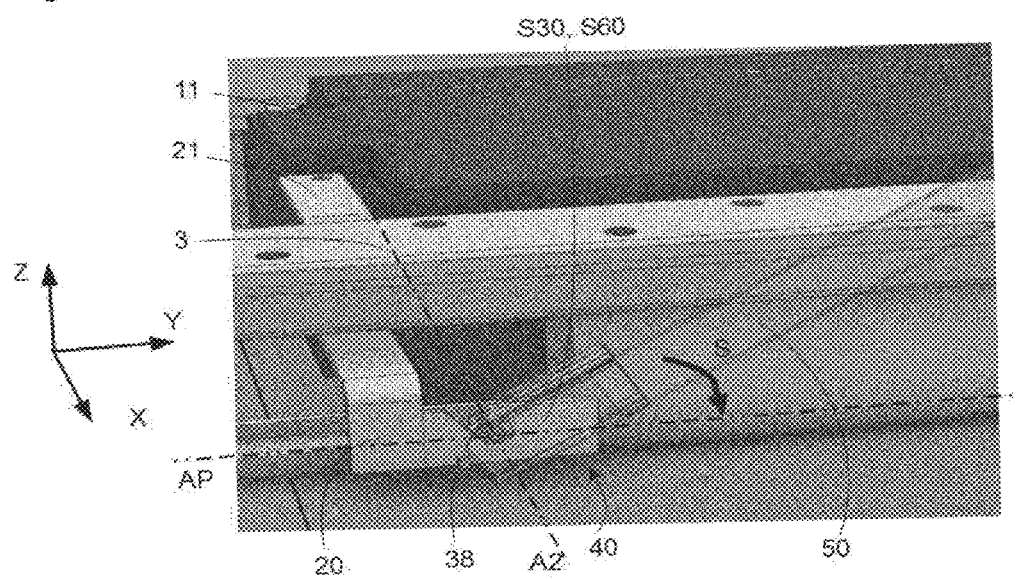
FIG. 11 is another detailed perspective view during the method for assembling the bus bar between two modules of the battery according to the embodiment of the invention, the second part being shown in transparency mode.

The fixing of the male part with the female part is carried out in two stages. As illustrated in FIGS. 8, 9 and 10 with a straight and thick arrow, the first stage comprises a translational movement. This relative translation of the female part 60 with respect to the male part 30, preferably downward, is implemented along a first axis A1, for example vertical or substantially vertical. The first axis A1 is parallel to the main plane P, or even included, or substantially included, within the main plane P. To continue this fixing and to provide an optimum grip, as illustrated in FIGS. 10 and 11, the second stage comprises a rotation of the female part 60 with respect to the male part 30 about a second axis A2 perpendicular to the first axis A1. The second axis A2 is perpendicular, or substantially perpendicular, to the main plane P. Preferably, the second movement, this time a rotation, is implemented over an angle of around 90 degrees, in other words over a quarter of a turn or substantially a quarter of a turn. As previously mentioned and illustrated in particular in FIGS. 11, 12 and 13, a main longitudinal axis AP of the bus bar 13 in the final connected position is included, or substantially included, within the main plane P.

The electrical conduction between the first part 20 and the second part 50 is provided by the male part and the female part. For this purpose, the male part 30 comprises a first electrical conduction element 31 and the female part 60 comprises a second electrical conduction element 61. The first electrical conduction element 31 cooperates with the second electrical conduction element 61 so as to conduct the electrical current from the male part to the female part and potentially vice versa. Indeed, the second electrical conduction element 61 is designed to be in contact with the first conduction element 31, in particular once the bar 13 is in its final connected position, in other words after the rotation about the second axis A2, as illustrated in particular in FIGS. 12 and 13.

Figure 7:
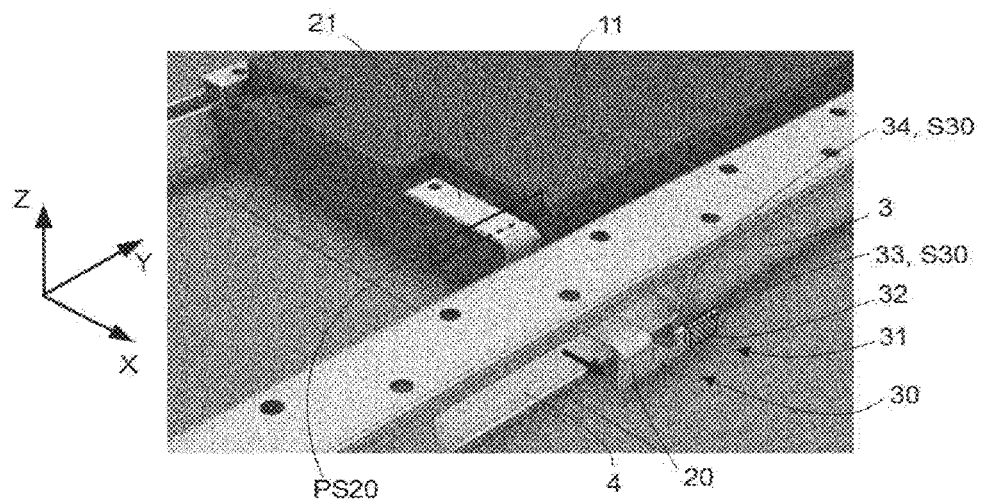
FIG. 7 is a detailed perspective view during the method of assembly of the bus bar between two modules of the battery according to the embodiment of the invention.

Advantageously, as illustrated in FIG. 7 with hatching, the first electrical conduction element takes the form of a plate 32, preferably parallelepipedal. Preferably, the two largest opposing faces 33, 34 of the plate 32 each have a contact surface area S30. This contact area S30 is preferably equal to at least four times a right cross-sectional area of the first part 20. This right cross-sectional area is obtained following a plane PS20 perpendicular to the dimension in which the part 21 mainly extends, as illustrated in figure V.

Figure 5:
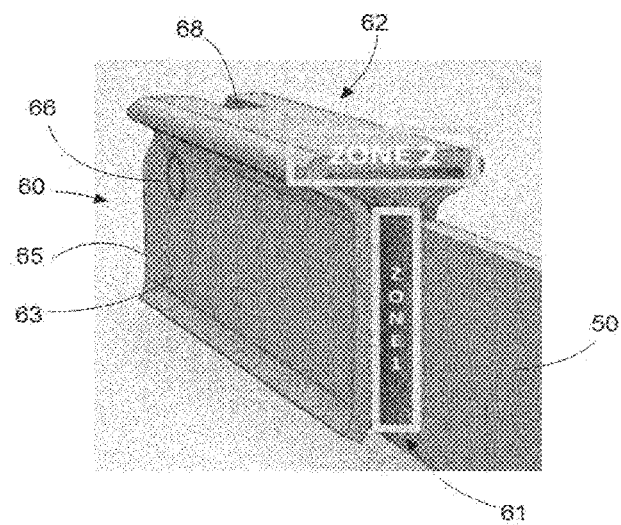
FIG. 5 is a perspective view of a female part of a connecting means for a bus bar according to one embodiment of the invention.
Figure 6:
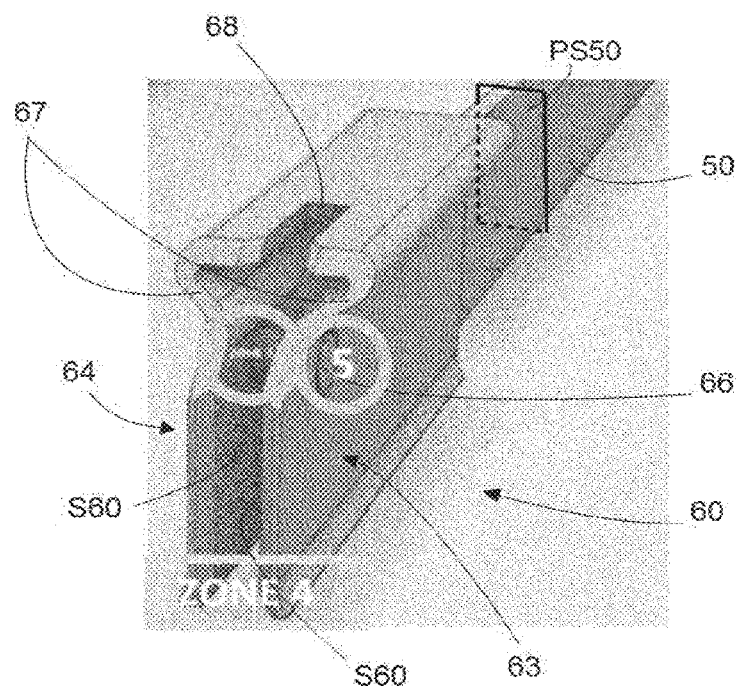
FIG. 6 is another perspective view of the female part of the connecting means according to the embodiment of the invention.

Advantageously, as illustrated in FIGS. 5 and 6, the second electrical conduction element 61 takes the form of a yoke 62 having two parallel or substantially parallel wings 63, 64. Thus, the internal areas of the wings 63, 64 come into contact with the two opposing faces 33, 34 of the plate 32 as soon as the female part is inserted over the male part. In other words, the two wings of the yoke pinch the plate. Thus, in the final connected position of the bar 13, the two wings 63, 64 of the yoke 62 each have a contact surface area S60 in contact with a contact area S30 of each opposing face 33, 34 of the plate 32. The contact area S60 is preferably equal to at least four times the right cross-sectional area of the second part 50. This right cross-sectional area is obtained following a plane PS50 perpendicular to the dimension in which the second part 50 mainly extends, as illustrated in FIG. 6.

In the final connected position of the second part 50 with the first part 20, the wings 63, 64 of the yoke 62 extend, or substantially extend, parallel to the main plane P, the contact areas S30, S60 being in contact.

Preferably, the right cross-sectional area of the first part 20 is equal, or substantially equal, to the right cross-sectional area of the second part 50. More preferably, the shape of the right cross-section of the first part is identical, or substantially identical, to the shape of the right cross-section of the second part. For example, the first and second parts 20, 50 have rectangular right cross-sections. Indeed, the first and second parts 20, 50 are preferably "metal flats", in other words flat metal strips whose thickness is much less than its width and its length.

Figure 13:
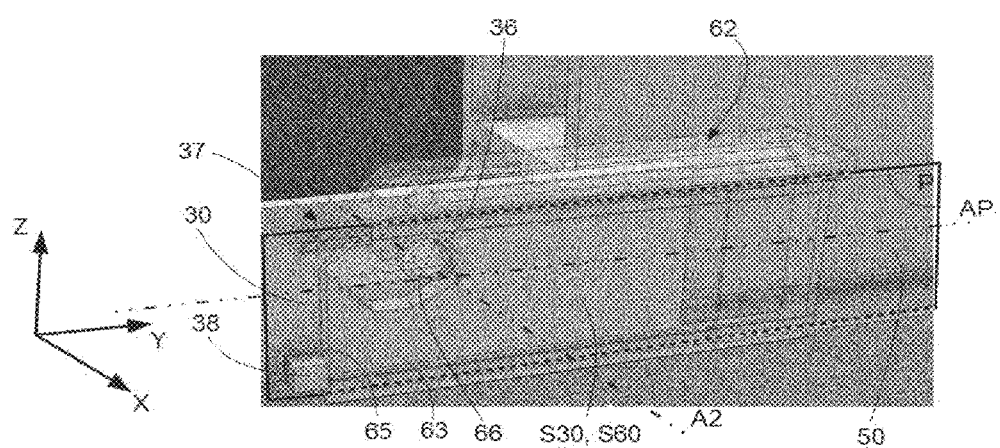
FIG. 13 is another detailed perspective view of the bus bar in the final connected position according to the embodiment of the invention, the second part being shown in transparency mode.

As illustrated in particular in FIGS. 10 and 13, the male part 30 of the connecting means 40 comprises a first immobilizing element 36 for the female part 60. This first immobilizing element is preferably a slot or a groove. The female part 60 then comprises a second immobilizing element 66 designed to cooperate with the first immobilizing element 36. This second immobilizing element is preferably a pin designed to block itself within the slot. Indeed, the diameter of the pin 66 is for example less than, or only just less than, the diameter of the orifice generated by the slot 36. Advantageously, as illustrated in FIGS. 10 and 13, the male part 30 furthermore comprises an element 37 for insertion of the pin 66 of the female part 60. Preferably, this insertion element is a notch coming out at the slot or in the slot. More preferably, the male part 30 comprises a means for end of travel in rotation 38, for example an end stop, arranged on the side of the face 33 of the plate 32. As illustrated in FIG. 13, this end stop 38 then comes into contact with the female part 60 when the second part 50 extends along the main longitudinal axis AP of the bus bar 13 in its final connected position. For example, the contact between the end stop 38 of the male part 30 and the female part 60 is made at the edge 65 of the wing 63 of the yoke 62.

Alternatively or as a complement, an end stop may be arranged on the side of the face 34 of the plate 32 so as to come into contact with an edge of the wing 64 of the yoke 62. Alternatively, a single end stop is arranged on the side of the face 34 of the plate 32 so as to come into contact with an edge of the wing 64 of the yoke 62.

Prior to the method for assembling the bus bar 13 which will be described in the following part, the front 11 and rear 12 modules are installed in or on the body 2 or the housing designed to receive them.

One embodiment of a method for assembling the bus bar 13 in such a manner that it extends between two battery modules is described hereinafter.

The method firstly comprises a step for supplying the first part 20 of the bus bar 13, the first part 20 comprising the male part 30, and for supplying the second part 50 of the bus bar 13, the second part 50 comprising the female part 60.

It should be noted that, for the sake of clarity, FIGS. 7, 8, 10, 11, 12 and 13 do not show any rear module 12. However, it is important to underline that the bus bar 13 is designed so as to be compatible with an installation while the front module or modules 11 and the rear module or modules 12 are already installed. Similarly, the method for assembling the bus bar, in particular between a front module 11 and a rear module 12, is compatible with the front module or modules 11 and the rear module or modules 12 being already installed. Indeed, as a reminder, one of the aims of the invention is to facilitate the installation of the electrical connection via a bus bar within a restricted space between two modules for example.

In the case of the presence of a partition 3 between a front module 11 and a rear module 12 that it is desired to connect together via the bar 13, preferably a hole 4 or orifice is arranged in the partition 3. In this case, the male part 30 of the first part 20 is engaged within the hole 4 such that it passes through it and that the male part is located on the side of the rear module 12, as illustrated by an arrow in FIG. 7. Subsequently, the first part 20 is fixed, for example by screwing with a screw passing through the part 21 and which cooperates with the front module 11.

As illustrated in FIG. 8, a step is subsequently carried out for engaging the female part 60 in the male part 30 by a first translational movement of the female part 60 relative to the male part 30 in the main plane P, or substantially in the main plane P. More precisely, the first translational movement is applied along the first axis A1, for example in the vertical direction or substantially in the vertical direction, downward. Thus, the second part 50 is approached from the top of the battery 10. In other words, the wings 63, 64 of the yoke 62 are engaged on either side of the plate 32. The contact areas S30 of the plate 32 and the contact areas S60 of the yoke 62 are then in contact with one another. It should be noted that the limited thickness along the second axis A2 of the yoke 62 allows it to pass between the rear module 12 and the body 2, or between the rear module 12 and the partition 3.

As illustrated in FIG. 10, the engagement step preferably comprises an insertion phase, or end of translation, during which the pin 66 of the female part 60 is inserted, or accommodated, or guided into the notch or groove 37 of the male part 30. From this point, two degrees of freedom between the female part and the male part are blocked.

As illustrated in FIG. 11, a final step for blocking or installing or fixing of the female part 60 with the male part 30 is subsequently carried out. Preferably, this blocking step is implemented by rotation of the female part 60 with respect to the male part 30 about, or substantially about, the second axis A2. This second rotational movement is carried out in the sense S illustrated by a curved arrow in FIGS. 10 and 11. As previously mentioned, the second axis A2 is perpendicular to the main plane P containing the main longitudinal axis AP of the bus bar 13 in the final connected position. In the embodiment illustrated, the blocking step ends after a rotation of a quarter of a turn, or substantially of a quarter of a turn. The contact areas S30 of the plate 32 and the contact areas S60 of the yoke 62 are then completely, or substantially completely, in contact with one another.

Advantageously, the blocking step comprises an end of travel in rotation of the female part 60. For example, this end of travel is implemented by the contact of the female part 60, for example one edge 65 of the wing 63 of the yoke 62, against the end stop 38 arranged on the male part 30 on the side of the face 33 of the plate 32. The end stop 38 thus blocks a third degree of freedom, the translation following the main longitudinal axis AP.

Preferably, in particular in order to avoid any interaction between the end stop 38 and the yoke 62 hindering or preventing the translation of the female part 60 within the notch 37 and/or the rotation of the blocking step, a chamfer 67 is provided. This chamfer 67 is formed on at least one, or even both wings 63, 64, of the yoke as illustrated in particular in FIGS. 6 and 10. More preferably, as illustrated in FIGS. 5 and 6, a protrusion or notch 68 is provided in the part holding the two wings of the yoke in order to avoid an interaction with the contour of the notch 37 during the translation and/or of the rotation.

It should be noted that, by reason of its contact against the edge 65 of the wing 63 of the yoke 62, the end stop 38 forces the pin 66 into the slot 36, in particular to the bottom of this slot, and thus participates in an optimum positioning of the female part with respect to the male part.

Finally, in order to provide the electrical conduction sought between the front module 11 and the rear module 12, the second part 50 is fixed onto the rear module 12, for example by screwing of a screw through the part and which then cooperates with the rear module.

Figure 12:
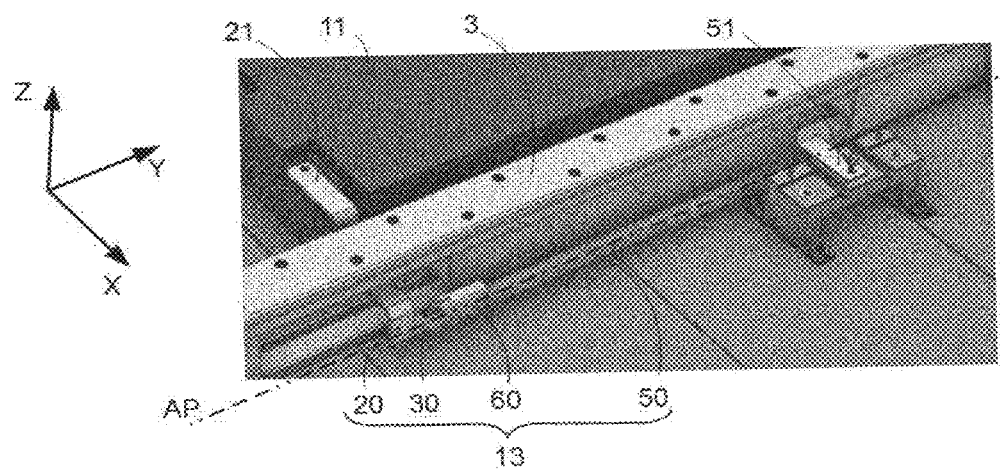
FIG. 12 is a perspective view of the bus bar in the final connected position according to the embodiment of the invention.

Accordingly, all the degrees of freedom of the male part 30 with respect to the female part 60, and as a consequence of the first part 20 with respect to the second part 50, are totally blocked, as illustrated in the final connected position of the bar 13 in FIG. 12.

This results in the bus bar 13 principally extending in the main plane P, parallel or substantially parallel to faces extending vertically and transversally of the modules 11, 12 and/or of the partition 3. The thickness of the female part along the second axis A2, for example in the range between 2 mm and 5 mm, preferably of the order of 3 mm, allows the rear module 12 to be arranged as near as possible to the partition 3 for example.

Such a bus bar only occupies a limited space and allows the volume of the modules, in other words the storage capacity for electrical energy within the battery 10, to be maximized.

Although the bar has been described so as to electrically connect a front module 11 with a rear module 12, the bus bar equipped with the connecting means 40 may also allow for example two front modules to be connected together or two rear modules to be connected together.

In summary, the "intermodule" connection is provided by the bus bar 13 despite its particular shape and its length, in particular owing to the positioning of its connection points on the modules. It may be assembled after installing the modules. This installation or assembly can be achieved despite the restricted space for its insertion, in particular between the rear module 12 and the body 2.

Furthermore, the contact areas S30, S60 on the connecting means 40 comply with the rule stating that the electrical conduction area is equal to at least four times the cross-sectional area of the bus bar in order to provide a good electrical conduction.

Indeed, the internal areas S60 of the wings 63, 64 of the yoke 62 in contact with the areas S30 of the opposing surfaces 33, 34 comply with this condition. In addition, both the first part 20 and the adjacent male part 30, together with both the second part 50 and the adjacent female part 60, have an appropriate cross-sectional area. It should be noted that the two wings 63, 64 of the yoke 62 provide plane or substantially plane contacts against the opposing faces 33, 34 of the plate 32 so as to provide an optimal electrical conduction. Preferably, the yoke 62 comprises an elastic part between its two wings so as to maintain firm contacts between the wings 63, 64 and the opposing faces 33, 34 of the plate 32. Furthermore, in order not to alter this elasticity, the pin 66 is preferably only fixed onto one wing of the yoke 62 so as not to affect the rigidity of the yoke and not to affect the separation of its two wings. For example, the separation between the two wings 63, 64 is slightly less than the separation between the two opposing faces 33, 34 so as to generate an elastic force providing a grip of the yoke 62 on the plate 32.

Thus, this bus bar in two parts which are fixed together offers an enhanced flexibility during the assembly, where the modules 11, 12 are able to be installed prior to the installation of the bar 13. The connecting means 40 is particularly compact which offers a gain of space and consequently the possibility of increasing the volume for electrical energy storage of the battery 10.

The connection or assembly or fixing of the female part with the male part is quick, simple and reliable.

It is noted that the solution therefore achieves the aim sought of facilitating the electrical connection between two modules of a battery, in particular separated by a partition, and offers the following advantages:

The connecting means 40 is simple to produce and makes use of widely available manufacturing techniques (cutting out, bending/folding, drilling), which renders it particularly economical;

The yoke 62 may be obtained by bending/folding;

The junction between the first part and the second part is formed without any specific tool;

The first and second parts 20, 50 of the bus bar may be dismantled, separated and reused, notably rendering the removal of a module straightforward, for example in order to change it or allow its maintenance or its exchange outside of its location;

The notch 37, the pin 66 and the slot 36 at the same time provide a function of guide pin which avoids any erroneous installation.

The invention claimed is:

1. A connection that provides an electrical junction between a first part of an electrical conduction bus bar and a second part of said bus bar, said connection comprising:
   a male part configured to be rigidly attached to the first part of the bus bar, and
   a female part configured to be rigidly attached to the second part of the bus bar,
   the male part and the female part being configured to fit into one another respectively following:
   a first translational movement of the female part relative to the male part along a first axis, followed by;
   a second rotational movement of the female part relative to the male part about a second axis perpendicular to the first axis.

2. The connection as claimed in claim 1, wherein the second rotational movement is a rotation of a quarter of a turn.

3. The connection as claimed in claim 1, wherein the male part comprises a first electrical conduction element, and
   the female part comprises a second electrical conduction element configured to progressively come into contact with the first conduction element throughout the first and second movements.

4. The connection as claimed in claim 1, wherein the male part comprises a first electrical conduction element in the form of a rectangular plate, and
   the female part comprises a second electrical conduction element in the form of a yoke having two parallel wings configured to come progressively into contact with two opposing faces of the plate throughout the first and second movements.

5. The connection as claimed in claim 4, wherein, following the first and second movements, the two opposing faces of the plate each have a contact area equal to at least four times a right cross-sectional area of a first part or of a second part of said bus bar, and
   the two wings of the yoke each have a contact area in contact with one of the two opposing faces of the plate, the contact area being equal to at least four times the right cross-sectional area of a first part or of a second part of said bus bar.

6. The connection as claimed in claim 1, wherein the male part comprises a first immobilizing element for the female part, and
   the female part comprises a second immobilizing element configured to cooperate with the first immobilizing element.

7. The connection as claimed in claim 1, wherein the male part comprises a first immobilizing element for the female part, and the first immobilizing element including a slot, and
   the female part comprises a second immobilizing element including a pin, the pin being blocked within the slot after the first and second movements.

8. The connection as claimed in claim 7, wherein the male part comprises an element for insertion of the second immobilizing element of the female part, the element for insertion including a notch coming out at the slot.

9. The connection as claimed in claim 1, wherein the male part comprises an end stop for end of travel in rotation, the end stop coming into contact with the female part following the first and second movements.

10. A bus bar for electrical conduction between modules of a battery, the bus bar comprising:
    the first part, and
    the second part, and
    the connection as claimed in claim 1 between the first and the second part.

11. A battery, comprising:
    at least one of the bus bar as claimed in claim 10.

12. A hybrid automobile or electric vehicle, comprising:
    the battery as claimed in claim 11.

13. A hybrid automobile or electric vehicle, comprising:
    at least one of the bus bar as claimed in claim 10.

14. A method for assembling the bus bar as claimed in claim 10, comprising:
    supplying the first part of the bus bar comprising the male part and the second part of the bus bar comprising the female part,
    after the supplying, engaging the male part into the female part by following the first translational movement of the female part relative to the male part in a main plane containing a main longitudinal axis of the bus bar in a final connected position, and
    after the engaging, blocking the female part with the male part by following the second rotational movement of the female part with respect to the male part about or substantially about a second axis perpendicular to the main plane.

15. The method as claimed in claim 14, wherein the second rotational movement is a rotation of a quarter of a turn.

16. The method as claimed in claim 14, wherein the engaging comprises an insertion phase during which a second immobilizing element of the female part is inserted into an insertion element of the male part.

17. The method as claimed in claim 14, wherein the engaging comprises an insertion phase during which a pin of the female part is inserted into a notch of the male part.

18. The method as claimed in claim 14, wherein the blocking comprises an end of travel in rotation of the female part against an end of travel means arranged on the male part such that a second immobilizing element of the female part is pushed back into a first immobilizing element of the male part.

19. The method as claimed in claim 14, wherein the blocking comprises an end of travel in rotation of the female part against an end stop arranged on the male part such that a second immobilizing element of the female part is pushed back into a slot of the male part.

* * * * *